Oct. 16, 1956 S. W. CHANTLER 2,766,516
MANUFACTURE OF HOLLOW SPRING PINS
Filed Nov. 19, 1951 2 Sheets-Sheet 1
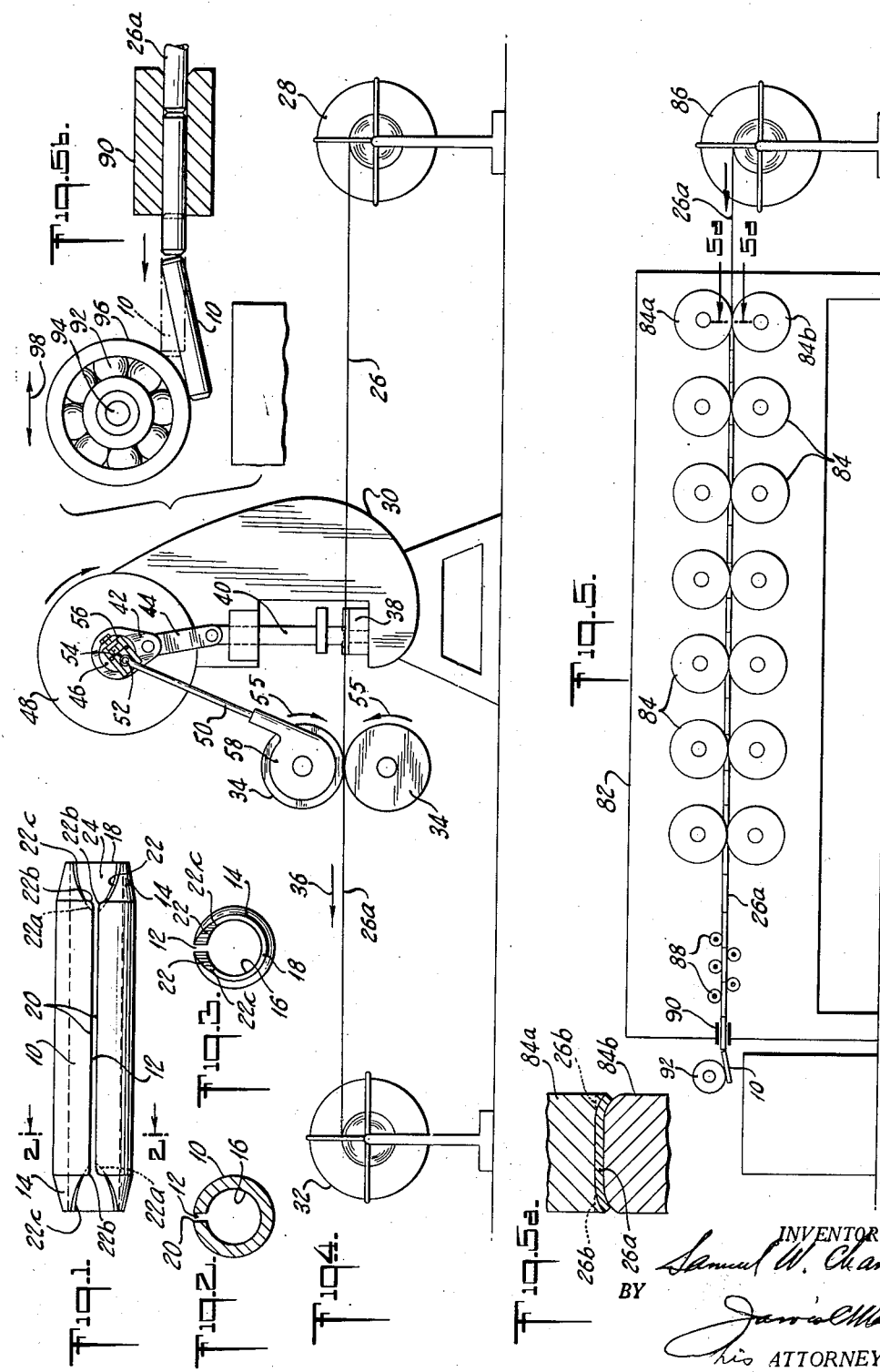
INVENTOR
Samuel W. Chantler
BY
his ATTORNEY.

Oct. 16, 1956  S. W. CHANTLER  2,766,516
MANUFACTURE OF HOLLOW SPRING PINS
Filed Nov. 19, 1951  2 Sheets-Sheet 2
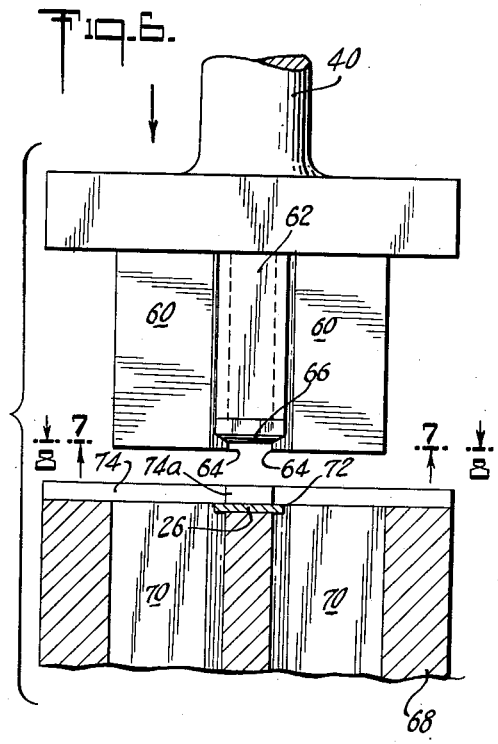
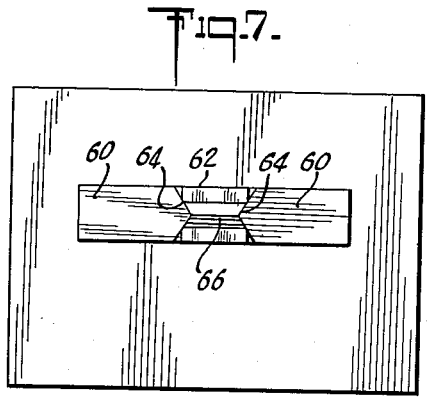
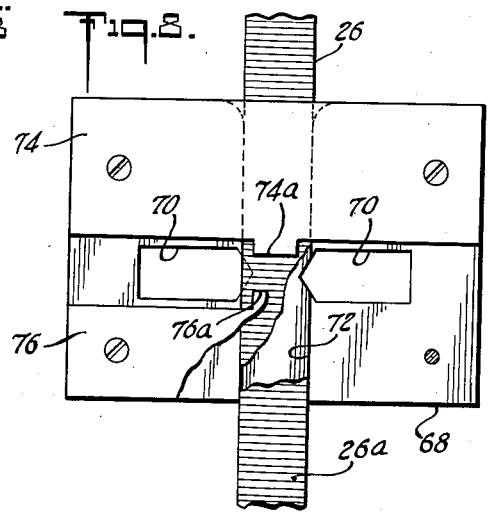
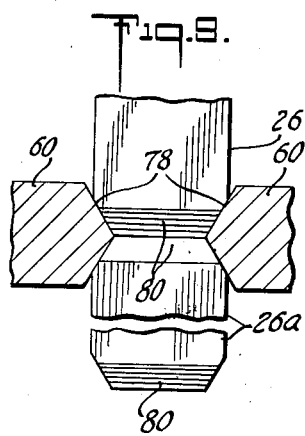
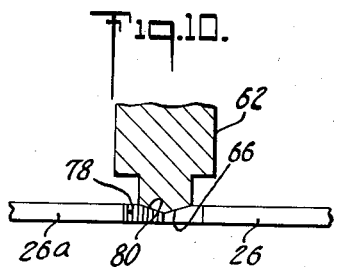
INVENTOR
Samuel W. Chantler
BY
ATTORNEY.

United States Patent Office 2,766,516
Patented Oct. 16, 1956

2,766,516

MANUFACTURE OF HOLLOW SPRING PINS

Samuel W. Chantler, South Orange, N. J., assignor to Elastic Stop Nut Corporation of America, Township of Union, County of Union, N. J., a corporation of New Jersey Application November 19, 1951, Serial No. 257,142

7 Claims. (Cl. 29—413)

The present invention relates to hollow spring pins and the manufacture thereof.

Hollow spring pins in the form of longitudinally split tubular bodies of elastic metal, intended for use as fastening elements by being driven into or through holes of slightly smaller diameter than the pins, have heretofore been used, but their use has been relatively limited owing both to the cost of the article as produced by previously known methods and deficiencies in the pins themselves as heretofore produced.

Broadly considered, the principal advantages to be derived from the use of hollow spring pins are found in applications where cotter pins, solid pins (both straight drive pins and taper pins) and like fastenings are usually employed. Among such advantages the following may be considered as among the most important. A substantially vibration proof connection may be established between the pin and the part or parts engaged by it, by making the diameter of the pin slightly larger than that of the hole which receives it, so that when installed the pin is elastically compressed and continuously presses against the surrounding walls to maintain the desired firm connection between the parts. The desired connection is obtained by the pin alone, being maintained by its inherent spring pressure and the pin may be installed by a simple driving operation. It may be equally readily removed by a similar driving operation, using a suitable drift pin or punch. Due to the elastic properties of the pins, they do not require accurately reamed holes for their reception, being able to compensate for variations within the usual commercial tolerances established for drilled holes, and also due to their elastic nature, used pins may be reused as effectively as when initially installed.

In order, however, for the above enumerated and other advantages of such pins to be made available, the pins themselves must possess certain dimensional form and characteristics as to individual pins, and uniformity of form and characteristics as between different pins of the same size, which are difficult to obtain. Moreover, in order to make the advantages of such pins generally available, they must be made on a mass production basis at relatively very low cost, without, however, sacrifice either of the required dimensional accuracy or uniformity of the product.

It is, therefore, among the general objects of the present invention to provide new and improved methods and means for producing pins of the character under consideration and to produce thereby pins of improved form. Other and more detailed objects and advantages will become apparent in the ensuing portion of this specification, which in conjunction with the accompanying drawings, provides disclosure of preferred apparatus and procedure for producing improved pins of the character under consideration, it being understood that such disclosure is by way of example only and is not limiting in nature, the scope of the invention being defined by the appended claims.

In the drawings:

Fig. 1 is a side elevation of a spring pin produced in accordance with the invention;

Fig. 2 is a cross section taken on the line 2—2 of Fig. 1;

Fig. 3 is an end view of the pin shown in Fig. 1;

Fig. 4 is a diagrammatic view illustrative of part of the apparatus employed in making pins in accordance with the invention;

Fig. 5 is a diagrammatic view of further apparatus employed in the manufacture;

Fig. 5a is a fragmentary section on enlarged scale taken on line 5a—5a of Fig. 5;

Fig. 5b is a fragmentary view on enlarged scale of another part of the apparatus diagrammatically shown in Fig. 5;

Fig. 6 is an elevation on enlarged scale of tooling employed in the apparatus shown in Fig. 4;

Fig. 7 is a view taken on the line 7—7 of Fig. 6;

Fig. 8 is a view taken on line 8—8 of Fig. 6;

Fig. 9 is an enlarged fragmentary view with certain parts removed for clarity, of part of the tooling shown in Fig. 6 with a work piece in position; and Fig. 10 is a view similar to Fig. 9 showing another part of the tooling with a work piece in position.

Referring now more particularly to Figs. 1 to 3 of the drawings there is illustrated a preferred example of pin embodying certain of the features of the invention. The pin comprises a unitary body 10 of elastic metal, usually but not necessarily of hardenable steel, such for example as a relatively high carbon steel, of which S. A. E. 1095 steel has been found to be highly satisfactory for the more usual uses. The material may, however, be of any desired alloy steel having suitable elastic properties, inclusive of the stainless steels of which S. A. E. No. 420 is satisfactory. The material also may be nonferrous, as for example alloys such as spring brass or bronze, beryllium copper and the like.

The body 10 is shaped to the form of a hollow cylindrical tube, advantageously of uniform wall thickness, longitudinally split to provide an open longitudinal slot or gap 12 extending from end to end of the pin. In the example shown, both ends of the pin, which are of a special and novel configuration, are alike, so that it will be sufficient to describe one. As seen in Figs. 1 and 3, the end portion of the outer surface of the pin is in the form of a tapered surface 14 which preferably but not necessarily is a plane bevel. The angle of inclination of the surface 14 with respect to the axis of the pin may vary but is advantageously not greater than 45° and preferably of the order of 30°. Also, the tapered surface preferably does not extend to and intersect the inner surface 16 of the wall of the pin, but is of larger radius at the end of the pin, so as to provide a narrow annular transverse end wall surface 18.

The edges 20 of the body 10, which are in confronting and longitudinally parallel spaced relation along substantially the entire length of the pin to constitute the side walls of the gap 12 in the form of a slot, are relieved at the end of the pin to diverge from each other, so that the gap 12 flares at its ends. The relief is preferably in the form of diverging bevels 22, forming between them a truncated triangular notch 24 coaxial with the axis of the gap 12. The included angle between the walls 22 of the notch may vary, but an angle of the order of 120° has been found satisfactory.

The axial extent of the notch 24 in the finished pin may be greater than that of the tapered surface 14 or it may be substantially coextensive therewith, the form of the structure at the place of juncture of the cylindrical and tapered surfaces with the notch and the gap being described more in detail hereinafter.

In accordance with the principles of the present invention pins of the above described character are made by forming into a continuous, open seam tube, which is broken into individual pins after being formed, a continuous metal strip previously prepared in the manner now to be described more particularly in connection with Figs. 4 and 6 to 10 inclusive.

As shown diagrammatically in Fig. 4 a strip of metal 26 the thickness of which corresponds to the desired wall thickness of the pins to be made and the width of which corresponds to the circumference less the width of the gap 12 of the desired pins is fed from a suitable feed roll 28 through a punch press 30, which may be of any desired conventional kind, to a winding reel 32, movement of the strip being effected intermittently by means of feed rolls 34 between which the strip is frictionally gripped, the rolls being provided in conventional manner with suitable spring load not illustrated. The direction of feed is as indicated by arrow 36 and the winding reel 32 may be rotated by any conventional winding means, not illustrated, for winding the strip delivered by the feed rolls, the latter however completely controlling the rate and nature of the feed of the strip through the press.

The press illustrated is of the conventional crank form having a bed or anvil 38 for supporting a die and a reciprocable plunger 40 actuated by crank 42 and connecting rod 44, crank 42 being a part of shaft 46 carrying flywheel 48. Shaft 46 may be rotated by any suitable driving means, not illustrated. The blank strip is drawn through the press intermittently in step-by-step progression in timed relation to the reciprocation of the plunger 40. This may be accomplished in any suitable fashion and in the arrangement diagrammatically illustrated, this is accomplished by means of mechanism (for clarity shown out of scale) comprising a link 50 pivoted at 52 to an adjustable block 54 carried by suitable guides 56 mounted on the crankshaft 46 and readily adjustable to vary the stroke of the link 50. The link 50 actuates a one way clutch mechanism which may be of any suitable kind and the housing of which is diagrammatically illustrated at 58 so that upon reciprocation of the link the feed rolls 34 are moved intermittently in the direction of arrows 55, the length of the strip advanced by each movement of the rolls being governed by the stroke of the link 50 as determined by the position of adjustment of the pivot 52. The mounting for the pivot end of the link 50 is angularly related to the crank 42 so that the punch later to be described and carried by the plunger 40 is synchronized to perform the working operation on the strip during the period of dwell of the strip between successive forward movements.

Referring now more particularly to the tooling more or less diagrammatically illustrated in Figs. 6 to 10, the tools comprise a punch assembly consisting of two confronting coping punches 60 and an embossing punch 62 located between the coping punches. As seen more clearly from Fig. 7, the coping punches 60 have confronting working faces 64, V-shaped in cross section. The lower ends of these faces project beyond the lower end of the embossing punch 62, the lower working face 66 of which is V shaped in cross section as shown more clearly in Fig. 10.

The die for cooperating with the punches comprises a die block 68 provided with openings 70 having the same cross sectional configuration as that of coping punches 60 and is further provided on its upper face between these recesses with a flat channel 72 for the reception and guidance of the strip 26. The latter is held in the guide channel by means of cover plates 74 and 76 fixed to the upper face of the die block and spaced apart to provide room for passage of the punches between them. The cover plates are advantageously provided with projections 74a and 76a overlying the strip as closely as possible to the embossing punch 62.

For purposes of illustration, structural details of the tooling which are not functional in nature with respect to the invention have been omitted, it being understood that the punches 60 and 62 are fixed to the plunger in any suitable manner so as to be rigidly held relative to the plunger and to each other. Also it will be understood that many variations in the specific construction of the tools can be made. Ordinarily, the coping and embossing punches are preferably made separate for manufacturing reasons although it will be obvious that the desired configuration of the coping and embossing surfaces can be formed in a one piece punch block. Also while for purposes of manufacturing economy the punches are advantageously provided with tips of cemented carbide or equivalent very hard material, such details have not been shown.

In the operation of the apparatus above described the strip 26, which is ordinarily of hardenable but unhardened metal, is drawn through the press by the feed rolls and its motion is arrested by a dwell during which the compound punch comprising the coping portions 60 and the embossing portion 62 engage the strip, the coping portions passing through the strip to shear it to provide two confronting V shaped notches such as indicated at 78 in Fig. 9. As the punch travels to the end of its stroke, and after the coping portions 60 have formed the notches in the strip, the embossing face 66 then impresses the V-shaped groove 80, as seen in Fig. 10, transversely across the strip between the confronting notches. The depth to which this groove is formed is determined by the length of the stroke of the press plunger in relation to the height of the strip as determined by the position of the die block. During the embossing phase of the operation the coping punch portions 60 act as abutments for laterally engaging and supporting the edges of the notches, so that the configuration of the notches is not deformed due to lateral flow or extrusion of metal resulting from the embossing operation. The scrap produced by the coping punches drops downwardly through the openings 70 in the die block.

As will be noted particularly from Fig. 9, the width of the notches 78 along the length of the strip is greater than the width of the groove 80. As the strip proceeds intermittently through the press, notched and grooved portions are formed at predetermined spaced intervals along the length of the strip, the spacing being determined by the stroke of the adjustable feed link 50 and the spacing between these notched and grooved portions determining the length of the pins formed from the strip by subsequent operations. In practice it has been found that the pressure of the transverse grooves 80 in the strip does not affect the accuracy with which the feed rolls advance the strip between dwells, because of the relatively very small size of the transverse grooves in the strip as compared with the diameters of the feed rolls.

Referring now more particularly to Figs. 5 and 5a, there is illustrated more or less diagrammatically the apparatus for forming the spring pins from the strip material previously prepared for the operations by the steps described above. For forming the flat strip into tubular form a continuous multiple stand roll mill indicated generally at 82 is employed. The general type of machine used is well known in the art and it therefore has not been illustrated in detail. It comprises a series of roll stands 84 each comprising an upper and lower forming roll and with the several stands driven in synchronized relation to feed the prepared strip 26a from a suitable feed roll 86 through the mill. The rolls of the several stands 84 are in accordance with known practice provided with peripheral forming surfaces, for progressively rolling the flat strip into the generally tubular form as shown in Fig. 2 and so far as the present invention is concerned they need not be described herein in detail other than with respect to one characteristic of their operation influencing certain aspects of this invention.

As shown on enlarged scale in Fig. 5a, the action of the rolls 84a and 85b at the first stand is to bend the edges of the strip 26a from the plane form of the strip indicated by the dotted lines in the figure. When the strip first comes into contact with the edges of the forming surface of the roll 84a, there is initially a line contact along the corner edge 26b of the strip and it is along this line of contact that force is exerted for bending the edge portion of the strip downwardly against the companion roll 84b. The resistance to bending is sufficient so that before bending is effected, the metal of the strip being unhardened and relatively ductile, the sharp corner edge of the strip is broken down to form a narrow bearing surface rather than a sharp line, through which surface the required pressure is applied to bend the edge of the strip. This deformation of the sharp corner of the strip, while of relatively minor character dimensionally, produces a certain amount of cold flow of the metal longitudinally of the strip along this corner and of sufficient magnitude so that if not compensated for, it would adversely affect the final form of the pin by displacing metal from along the corner edge to the region of the transverse notches 78 in the strip which subsequently form the beveled surfaces 14 at the ends of the pins. Unless compensated for, the displaced metal would project from the conical envelope of the beveled surfaces of the finished pin along the confronting edge portions of these surfaces and form undesirable projections, and it is for this reason that the notches 78, the sides of which form the surfaces 22 in the finished pins, extend lengthwise a greater distance than the width of the grooves 80 forming the conical surfaces 14, to provide small cut-away or relieved portions 22a in the cylindrical portion of the pin of full wall thickness immediately adjacent to the beveled end surfaces. Metal displaced longitudinally along the edges 26b may therefore flow into the spaces provided by the notched portions 22a, which, since they are in the portion of the strip which is contacted by the successive rolls as the strip moves through the mill, provide the necessary relieving space for displaced metal which is at the same time radially confined so as not to project at any place radially beyond the desired outer surface of the finished pin.

In the pin shown in Fig. 1, the dotted lines 22a indicate the outline that would be produced by the notches 78, formed as shown in Fig. 1, if no displacement of metal of the kind just described took place, while 22b indicates the displaced metal. Obviously, with different sizes and wall thickness of pins and with different metals, the amount of this displacement will vary but can readily be compensated for by properly relating the linear extent of the notches to that of the beveled surfaces, the objective being to prevent displaced metal from flowing lengthwise into the regions of the beveled surfaces and protruding radially beyond the envelopes thereof.

Because of notching of the beveled surfaces, and also because the rolling operation is performed on a continuous strip, the grooved portions of the strip are rolled into substantially true surfaces of revolution. This is in marked contrast with earlier forms of pins not provided with notched ends and made in the usual manner by forming individual blanks of material with previously beveled edges. In the latter case it is substantially impossible to form true circular ends, the corners corresponding to the corners 22c of the present pin flaring outwardly from the desired true circles at the ends of the pin.

After proceeding through the roll stands and being formed to the cylindrical shape shown in Fig. 2, the strip is then preferably passed through a series of straightening rolls 88 of known kind and from these rolls the formed strip, which is in effect an open seam tube, passes through a suitably supported hard guide bushing 90 shown in Fig. 5b, in alignment with the straightening rolls. Suitably spaced from the end of the bushing 90, means is provided for deflecting the tubular blank as it emerges, to break it at the weakened sections where the material is notched and grooved. Advantageously, this means may be a freely rotatable ball bearing 92 mounted on a spindle 94, so that the blank strikes the outer hardened race 96 of the bearing to break off the individual pins as indicated in the figure. Obviously, a stationary deflecting abutment may be used, but the arrangement shown is preferred. In order to secure a clean break without bending or otherwise deforming the next succeeding pin, the bearing should be located with reference to the bushing 90 so that each pin to be broken off strikes the bearing and is deflected while the next succeeding pin is substantially fully supported by the bushing.

The strip preparing and rolling operations are carried out with the metal in relative malleable or ductile condition, as when in annealed state, and after the individual pins have been produced, they may then be subjected in known manner to whatever heat treatment may be appropriate to produce the hardened or spring condition required to enable the pins to function as intended. In certain instances, pins of the physical form shown may be employed in applications where spring properties are not essential and for such uses the hardening step may be omitted, but for the more usual uses of the product, forming of the pins from metal in ductile state, followed by hardening, is the indicated procedure.

Pins of the same diameter but of different desired lengths can be formed by the roll mill with the same tooling, since the operation is a continuous one and the desired different lengths of the pins are obtained merely by varying the spacing between the notched and grooved portions of the blank prepared as previously described. In order to compensate for different lengths of pins while providing the desired support for the blank at the station where the pins are broken off, the spindle 94 is adjustably mounted so as to be movable as indicated by the arrow 98 to positions such that for any length of pin emerging from the mill, contact with the bearing is made with the next succeeding pin substantially fully supported.

The apparatus and the mode of operation above described enable pins of the character under discussion to be produced with great rapidity and at very low cost. It has been found that blanks prepared in the manner described may be fed through a continuous roll mill at very high speeds amounting to several hundred feet per minute, giving very high production capacity since pins of the kind under discussion are ordinarily relatively short, varying in length from minor fractions of an inch to usually a few inches at most. For a given diameter of pin, production can be changed from one to another length of pin without change in the roll mill other than a simple adjustment of the means for breaking off the individual pins and with only an equally simple adjustment of the feed rolls for the press for preparing the strip material. For different diameters of pins, different sets of rolls, which can very readily be changed, are required, and preparation of the required strips of different width is readily accomplished by relatively simple changes in the die and punch equipment. For such changes the punches are advantageously made as separate pieces, as illustrated, since for preparing strips for pins of different diameter but of the same wall thickness it is evident that the same coping punches 60 may be employed with different embossing punches of different widths inserted between the coping punches. By making the die block of separate parts it is evident that this can also be readily varied to provide guide channels 72 of different width and appropriate openings 70 for coaction with different arrangements and spacings of the compound punch comprising the coping and embossing portions.

It will further be evident that by preparing the strip in the manner described, spring pins may be produced which are substantially true symmetrically about their longitudinal axis, not only as to their central cylindrical portions of full thickness but also as to the beveled end portions which in their preferred form provide substantially true tapered envelopes which not only facilitate straight entry and driving of the pins into the holes provided for them but also avoid any corners (for example as at 22c previously discussed) or edges of metal projecting from such envelopes and tending to score the walls of the holes when pins are driven or removed.

Obviously, variations may be made in the specific configuration of the pins, the beveled ends of which need not necessarily be conical and which also need not be identical at both ends of the pin. Also, the notches need not necessarily be of V-shaped form, nor do they need to be symmetrical if it is desired to produce pins for special purposes having ends of different specific configuration. All such changes in specific configuration may obviously be readily made simply by changing to desired form the configurations of the coping and embossing punches.

Also, other known forms of machine tools may be employed for effecting the above described steps of manufacture.

It is accordingly to be understood that the invention is not limited, as to method, apparatus or the article produced thereby, to the example of the present disclosure, but is to be considered as embracing all that falls within the scope of the appended claims.

What is claimed:

1. In the manufacture of hollow spring pins from strip material, that improvement which comprises intermittently advancing a strip through a work station, shearing the opposite edges of the strip at said station during a period of dwell between successive advances of the strip to provide a pair of confronting notches, transversely impressing one face of the strip at said station during the same period of dwell and while laterally supporting the notched edge portions of the strip to form a groove extending transversely of the strip between said notches, advancing the notched and grooved strip continuously through a series of forming stations to shape the strip into an open seam tubular blank, laterally supporting the moving finally shaped blank and laterally deflecting the end portion of the moving blank emerging from the place of support to break the blank at the places weakened by the notches and grooves to produce individual pins.

2. The method of making hollow spring pins which comprises notching the opposite edges of an elongated strip of metal the width of which is substantially equal to the circumference of the pins to be formed therefrom to provide pairs of confronting substantially V-shaped notches, the notches of each pair being mirror images of each other and the pairs of notches being spaced along the strip by distances equal to the length of the pins to be formed, forming substantially V-shaped grooves in one face of the strip extending transversely between each confronting pair of notches, forming the grooved and notched strip to cylindrical shape with the edges of the strip in parallel confronting spaced relation with the grooves on the external surface of the formed strip, and breaking the strip at said grooved and notched places to form individual pins each having substantially conical beveled external end portions formed by walls of the transverse grooves and having a relatively narrow gap extending longitudinally of the pin and flaring at each of the conical end portions of the pin due to the removal of material resulting from said notching.

3. The method of making hollow spring pins which comprises shearing the opposite edges of an elongated strip of metal the width of which is substantially equal to the circumference of the pins to be formed therefrom to provide pairs of confronting substantially V-shaped notches having an obtuse included angle between the sides thereof, the notches of each pair being mirror images of each other and the pairs of notches being spaced along the strip by distances equal to the length of the pins to be formed, impressing substantially V-shaped grooves having obtuse included angles between the walls thereof in one face of the strip extending transversely between the apex portions of each confronting pair of notches, forming the grooved and notched strip to cylindrical shape with the edges of the strip in parallel confronting spaced relation and with the grooves on the external surface of the formed strip, and breaking the strip at said grooved and notched places to form individual pins each having substantially conical beveled external end portions formed by walls of the transverse grooves and having a relatively narrow gap extending longitudinally of the pin and flaring at each of the conical end portions of the pin due to the removal of material resulting from the shearing of said notches.

4. The method of making hollow spring pins which comprises shearing the opposite edges of an elongated strip of metal the width of which is substantially equal to the circumference of the pins to be formed therefrom to provide pairs of confronting substantially V-shaped notches having an obtuse included angle between the sides thereof, the notches of each pair being mirror images of each other and the pairs of notches being spaced along the strip by distances equal to the length of the pins to be formed, impressing substantially V-shaped grooves having obtuse included angles between the walls thereof in one face of the strip extending transversely between the apex portions of each confronting pair of notches, said grooves being narrower lengthwise of the strip than said notches, forming the grooved and notched strip to cylindrical shape with the edges of the strip in parallel confronting spaced relation and with the grooves on the external surface of the formed strip, and breaking the strip at said grooved and notched places to form individual pins each having substantially conical beveled external end portions formed by walls of the transverse grooves and having a relatively narrow gap extending longitudinally of the pin and flaring at each of the concial end portions of the pin due to the removal of material resulting from the shearing of said notches, the length of said flaring portions being greater than the length of said conical end portions.

5. The method of making hollow spring pins which comprises shearing the opposite edges of an elongated strip of metal the width of which is substantially equal to the circumference of the pins to be formed therefrom to provide pairs of confronting substantially V-shaped notches, the notches of each pair being mirror images of each other and the pairs of notches being spaced along the strip by distances equal to the length of the pins to be formed, impressing substantially V-shaped grooves in one face of the strip extending transversely between the apex portions of each confronting pair of notches while laterally supporting the edges of said notches, whereby to prevent deformation of the contours of the notches due to flow of metal resulting from the impressing operations, forming the grooved and notched strip to cylindrical shape with the edges of the strip in parallel confronting spaced relation and with the grooves on the external surface of the formed strip, and breaking the strip at said grooved and notched places to form individual pins each having substantially concial beveled external end portions formed by walls of the transverse grooves and having a relatively narrow gap extending longitudinally of the pin and flaring at each of the concial end portions of the pin due to the removal of material resulting from said notching.

6. Apparatus for forming hollow spring pins from strip metal transversely grooved at spaced intervals, comprising a roll mill having a plurality of aligned spaced roll stands for progressively shaping a strip of such material into an open seam tubular blank, a guide comprising a body of hard metal having a bore aligned for the passage therethrough of said tubular blank for laterally supporting the same and means providing a substantially freely rotatable abutment surface extending laterally across the projection of the longitudinal axis of the bore in said guide and spaced longitudinally from the discharge end of said guide so that the abutment surface is impinged by and laterally deflects the end of the blank emerging from said guide at a distance from the discharge end of said bore approximately equal to the distance between adjacent ones of the transverse grooves in the blank, whereby to break from the blank at the places weakened by said grooves a succession of individual pins of a length determined by the spacing between adjacent grooves.

7. Apparatus as defined in claim 6 in which the means providing said abutment surface is adjustable longitudinally of said axis toward and away from said guide.

References Cited in the file of this patent

UNITED STATES PATENTS

| | | |
|---|---|---|
| 1,721,431 | Claff | July 16, 1929 |
| 2,024,485 | Sussman | Dec. 17, 1935 |
| 2,222,842 | Humphrey | Nov. 26, 1940 |
| 2,248,720 | Pruckner | July 8, 1941 |
| 2,444,463 | Norquist | July 6, 1948 |
| 2,582,062 | Peters | Jan. 8, 1952 |
| 2,582,063 | Zitzewitz | Jan. 8, 1952 |
| 2,621,622 | Henchert | Dec. 16, 1952 |

FOREIGN PATENTS

| | | |
|---|---|---|
| 258,454 | Germany | Apr. 5, 1913 |
| 666,038 | Germany | Oct. 8, 1938 |
| 890,122 | France | Jan. 28, 1944 |